United States Patent
Reinmuth

(10) Patent No.: US 10,845,262 B2
(45) Date of Patent: Nov. 24, 2020

(54) MICROMECHANICAL COMPONENT FOR A PRESSURE SENSOR DEVICE

(71) Applicant: Robert Bosch GmbH, Stuttgart (DE)

(72) Inventor: Jochen Reinmuth, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 163 days.

(21) Appl. No.: 16/302,467

(22) PCT Filed: May 10, 2017

(86) PCT No.: PCT/EP2017/061176
§ 371 (c)(1),
(2) Date: Nov. 16, 2018

(87) PCT Pub. No.: WO2017/202611
PCT Pub. Date: Nov. 30, 2017

(65) Prior Publication Data
US 2019/0277717 A1 Sep. 12, 2019

(30) Foreign Application Priority Data
May 27, 2016 (DE) .................. 10 2016 209 241

(51) Int. Cl.
*G01L 9/00* (2006.01)
*G01P 15/125* (2006.01)
(Continued)

(52) U.S. Cl.
CPC .............. *G01L 9/0072* (2013.01); *G01L 9/12* (2013.01); *G01P 15/125* (2013.01); *G01P 2015/0828* (2013.01)

(58) Field of Classification Search
CPC . G01L 9/0072; G01L 9/00; G01L 9/12; G01P 15/125; G01P 2015/0828;
(Continued)

(56) References Cited

U.S. PATENT DOCUMENTS

2005/0109109 A1* 5/2005 Eskridge ............. G01P 15/0802
73/514.32
2010/0107763 A1* 5/2010 Lin ........................ G01P 15/18
73/514.32
(Continued)

FOREIGN PATENT DOCUMENTS

CN          1492994 A     4/2004
CN          102401715 A   4/2012
(Continued)

OTHER PUBLICATIONS

International Search Report for PCT/EP2017/061176, dated Aug. 8, 2017.
(Continued)

*Primary Examiner* — Francis C Gray
(74) *Attorney, Agent, or Firm* — Norton Rose Fulbright US LLP; Gerard Messina

(57) ABSTRACT

A micromechanical component for a pressure sensor device, including a diaphragm, which separates a reference pressure from an external pressure, at least one first stator electrode, at least one second stator electrode, and a rocker-arm structure, which is tiltable about an axis of rotation and has at least one first actuator electrode and at least one second actuator electrode; the rocker-arm structure being joined to the diaphragm so that when the external pressure and the reference pressure are equal, the rocker-arm structure and its actuator electrodes are present in their starting positions; if the rocker-arm structure and its actuator electrodes are in their starting positions, a first capacitance between the at least one first actuator electrode and the at least one first stator electrode differing from a second capacitance between the at least one second actuator electrode and the at least one second stator electrode.

4 Claims, 3 Drawing Sheets

(51) Int. Cl.
*G01L 9/12* (2006.01)
*G01P 15/08* (2006.01)

(58) Field of Classification Search
CPC ........ G01P 15/08; H02N 1/00; H02N 1/0006; B81B 3/00; B81B 3/0016; B81B 3/0018
See application file for complete search history.

(56) References Cited

U.S. PATENT DOCUMENTS

| | | | | |
|---|---|---|---|---|
| 2010/0242603 | A1* | 9/2010 | Miller | G01P 15/125 73/514.32 |
| 2011/0296919 | A1* | 12/2011 | Reinmuth | G01P 15/0802 73/514.38 |
| 2012/0186347 | A1* | 7/2012 | McNeil | G01P 15/125 73/514.32 |
| 2013/0047726 | A1* | 2/2013 | Lin | G01C 19/5712 73/504.12 |
| 2013/0299923 | A1* | 11/2013 | Classen | B81B 3/0018 257/415 |
| 2013/0319117 | A1* | 12/2013 | McNeil | G01P 15/18 73/514.32 |
| 2014/0060169 | A1* | 3/2014 | McNeil | G01L 9/12 73/146.5 |
| 2014/0217929 | A1* | 8/2014 | Lin | H02N 1/006 318/116 |
| 2017/0108391 | A1* | 4/2017 | Ikehashi | G01L 9/0042 |
| 2020/0088598 | A1* | 3/2020 | Zehringer | B81B 3/0059 |

FOREIGN PATENT DOCUMENTS

| | | |
|---|---|---|
| CN | 202735005 U | 2/2013 |
| JP | 2600049 B2 | 4/1997 |
| JP | 2010008138 A | 1/2010 |
| JP | 4459428 B2 | 4/2010 |
| JP | 2014115099 A | 6/2014 |

OTHER PUBLICATIONS

Yang, Zhishan: Summary of foreign digital pressure sensors, in Industrial instruments and automation devices, (1981).

* cited by examiner

MICROMECHANICAL COMPONENT FOR A PRESSURE SENSOR DEVICE

FIELD OF THE INVENTION

The present invention relates to a micromechanical component for a pressure sensor device, as well as to a pressure sensor device. The present invention also relates to a method for manufacturing a micromechanical component for a pressure sensor device. Furthermore, the present invention relates to use of a micromechanical component for measuring a pressure difference from an operating pressure.

BACKGROUND INFORMATION

A pressure sensor having a rocker-arm structure tiltable about an axis of rotation is discussed in US 2014/0060169 A1. The rocker-arm structure includes a first actuator electrode on a first side of the axis of rotation and a second actuator electrode on a second side of the axis of rotation. In addition, the rocker-arm structure is enclosed in an airtight housing; a diaphragm situated on the housing separating a reference pressure present in the housing from an external pressure/a measuring pressure present in an outer volume of the housing. The housing also includes a first stator electrode assigned to the first actuator electrode and a second stator electrode assigned to the second actuator electrode.

SUMMARY OF THE INVENTION

The present invention provides a micromechanical component having the features described herein, a pressure sensor device having the features described herein, a use of a micromechanical component for measuring a pressure difference, having the features of described herein, and a method for manufacturing a micromechanical component for a pressure sensor device, having the features described herein.

The present invention provides options for ascertaining a change in pressure on the basis of an easily detectable change in capacitance/total change in capacitance, which runs (at least approximately) linearly with respect to the change in pressure. Therefore, the present invention makes it easier to ascertain the change in pressure by evaluating the change in capacitance/total change in capacitance (at least approximately) linear with respect to it, and allows the use of evaluation electronics that are inexpensive and require little space for this operation. Thus, the present invention contributes towards reducing the production costs of pressure sensor devices, and towards minimizing them.

In addition, in spite of the use of simple evaluation electronics requiring little space, a pressure change may be detected/ascertained by the present invention at a comparatively high accuracy, and with a relatively low error rate. In addition, the present invention contributes to the implementation of pressure sensor devices, which may easily be calibrated and react comparatively indifferently to stress from outside.

A first average, basic distance of the at least one first stator electrode from the at least one first actuator electrode present in its starting position may differ from a second average, basic distance of the at least one second stator electrode from the at least one second actuator electrode present in its starting position. This produces the advantageous, different capacitances between the stator electrodes and the actuator electrodes present in their starting positions.

In one further, advantageous specific embodiment, an area of a first electrode surface of the at least one first stator electrode differs from a second area of a second electrode surface of the at least one second stator electrode. As an alternative, or in addition to that, in comparison with the at least one second stator electrode, the at least one first stator electrode may also include an additional insulating cover. The advantageous, different capacitances between the stator electrodes and the actuator electrodes in their starting positions may also be produced in this manner.

In particular, the micromechanical component may be configured to measure a pressure difference of the external pressure from an operating pressure pw, in which:

$$\frac{A1*S1}{A2*S2} = \frac{(G1-S1*pw)^3}{(G2+S2*pw)^3}$$

where A1 is the first area of the first electrode surface of the at least one first stator electrode, A2 is the second area of the second electrode surface of the at least one second stator electrode, G1 is the first average, basic distance of the at least one first stator electrode from the at least one first actuator electrode present in its starting position, G2 is the second average, basic distance of the at least one second stator electrode from the at least one second actuator electrode present in its starting position, S1 is a first sensitivity of a first capacitor made up of the at least one first actuator electrode and the at least one first stator electrode, and S2 is a second sensitivity of a second capacitor made up of the at least one second actuator electrode and the at least one second stator electrode. As explained below in more detail, this produces the advantageous linearity of the change in capacitance/change in total capacitance with respect to the change in pressure.

For example, the first area of the first electrode surface of the at least one first stator electrode may be equal to the second area of the second electrode surface of the at least one second stator electrode, the first sensitivity may be equal to the second sensitivity, and a difference between the first average, basic distance and the second average, basic distance may be configured in such a manner, that at the operating pressure, a first average distance of the at least one first stator electrode from the at least one first actuator electrode is equal to a second average distance of the at least one second stator electrode from the at least one second actuator electrode.

In the same way, the first average, basic distance may be equal to the second average, basic distance, and the first sensitivity may be equal to the second sensitivity, and the following may apply:

$$\frac{A1}{A2} = \frac{(G1-S1*pw)^3}{(G1+S1*pw)^3}.$$

Alternatively, the first average, basic distance may be equal to the second average, basic distance, the first sensitivity may not be equal to the second sensitivity, and the first area of the first electrode surface of the at least one first stator electrode may be unequal to the second area of the second electrode surface of the at least one second stator electrode, and the following may apply:

$$\frac{A1*S1}{A2*S2} = \frac{(G1 - S1*pw)^3}{(G1 + S2*pw)^3}.$$

In this case, the at least one first stator electrode advantageously has a first average rotational axis distance from the axis of rotation not equal to a second average rotational axis distance of the at least one second stator electrode from the axis of rotation.

In addition, the first average, basic distance may be equal to the second average, basic distance, and the first area of the first electrode surface of the at least one first stator electrode may be equal to the second area of the second electrode surface of the at least one second stator electrode, and, in comparison with the at least one second stator electrode, the at least one first stator electrode may include the additional insulating cover.

The advantages mentioned above are also provided in a pressure sensor device including such a micromechanical component.

In addition, a use of a corresponding micromechanical component for measuring a pressure difference of the external pressure from the operating pressure provides the described advantages.

Furthermore, execution of a corresponding method for manufacturing a micromechanical component for a pressure sensor device provides the described advantages, as well. The method may be refined further in accordance with the above-described specific embodiments of the micromechanical component.

Additional features and advantages of the present invention are explained below in light of the figures.

DETAILED DESCRIPTION

The micromechanical components described in the following are advantageously capable of being used, in particular, for a pressure sensor device. However, it is emphasized that a capability of the micromechanical components of being used is not limited to this application.

Figure 1A:
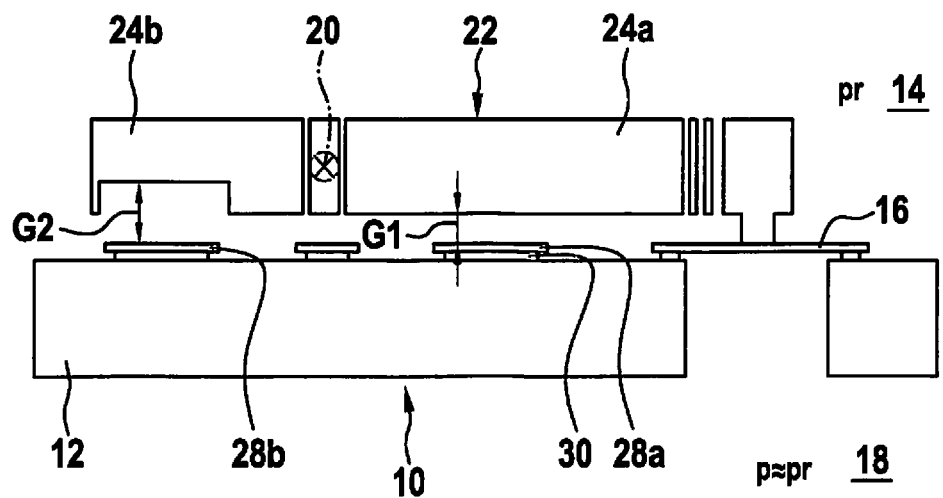
FIG. 1a and FIG. 1b show schematic views of a first specific embodiment of the micromechanical component.
Figure 1B:
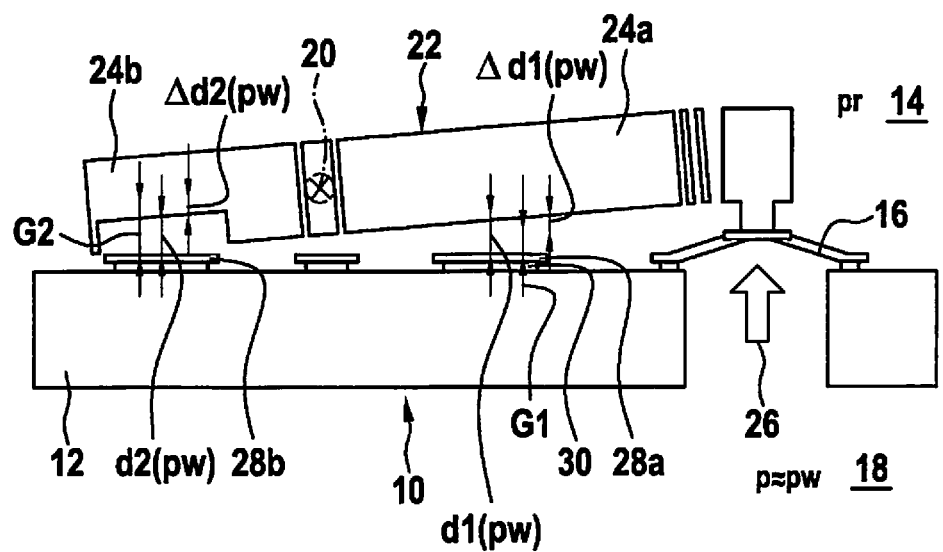

FIGS. 1a and 1b show schematic views of a first specific embodiment of the micromechanical component.

The micromechanical component schematically depicted in FIGS. 1a and 1b includes a housing 10, of which, however, for reasons of improved clarity, only a mounting board/substrate 12 is drawn into FIGS. 1a and 1b. Housing 10 encloses an inner volume 14 in an airtight manner; a diaphragm 16 of housing 10 separating a reference pressure pr present in inner volume 14 from an external pressure p present in an outer volume 18. For example, diaphragm 16 may occlude, in an airtight manner, an opening patterned through mounting board 12. The reference pressure pr present in inner volume 14 may be (nearly) equal to zero. In particular, a vacuum may be present in inner volume 14.

The micromechanical component also includes a rocker-arm structure 22, which is tiltable/rotatable about an axis of rotation 20 and may be situated in inner volume 14. Rocker-arm structure 22 is equipped with at least one first actuator electrode 24a situated on a first side of axis of rotation 20, and with at least one second actuator electrode 24b situated on a second side of axis of rotation 20. In addition, rocker-arm structure 22 is joined to diaphragm 16 in such a manner, that when external pressure p and reference pressure pr are equal, rocker-arm structure 22 and its actuator electrodes 24a and 24b are in their starting positions.

FIG. 1a shows rocker-arm structure 22 at an external pressure p (approximately) equal to reference pressure pr. In contrast, FIG. 1b represents a situation, in which the external pressure p present in outer volume 18 is equal to an operating pressure pw (different from reference pressure pr). It is discernible that this inequality of external pressure p and reference pressure pr produces a pressure force 26, which bulges diaphragm 16 outwards or inwards and, in FIG. 1b, causes rocker-arm structure 22 to rotate about axis of rotation 20, out of the starting position (depicted in FIG. 1a).

Operating pressure pw may be understood as an external pressure p, which is present, as a rule, in an area of use of the micromechanical component. The micromechanical component of FIGS. 1a and 1b is "dimensioned," in particular, for operating pressure pw; that is, the micromechanical component is configured to measure a deviation of external pressure p from operating pressure pw, that is, to measure a difference between external pressure p and operating pressure pw.

The micromechanical component also includes at least one first stator electrode 28a rigidly mounted to housing 10 and assigned to the at least one first actuator electrode 24a. Accordingly, at least one second stator electrode 28b assigned to the at least one second actuator electrode 24b is rigidly mounted to housing 10. A rigid mounting of stator electrodes 28a and 28b to housing 10 is understood to mean that (in contrast to a position/setting of actuator electrodes 24a and 24b,) a position/setting of stator electrodes 28a and 28b is not affected by a tilting movement of rocker-arm structure 22 about axis of rotation 20. In the example of FIGS. 1a and 1b, stator electrodes 28a and 28b are attached to an upper surface of mounting board 12 delimiting inner volume 14; stator electrodes 28a and 28b optionally being insulated from mounting board 12 by at least one insulating layer 30. However, as an alternative or in addition to that, (further) stator electrodes may also be mounted to housing 10 on a side of rocker-arm structure 22 directed away from mounting board 12 and/or diaphragm 16.

Often, a pressure sensor device equipped with rocker-arm structure 22 is also called a differentially-operating pressure sensor, which measures an external pressure p, using the bulging of diaphragm 16 and the tilting/rotation of rocker-arm structure 22 about axis of rotation 20 resulting from it, by measuring a total change of capacitance ΔC of a sum of a first capacitance C1 of a first capacitor made up of the at least one first actuator electrode 24a and the at least one first stator electrode 28a, and a second capacitance C2 of a second capacitor made up of the at least one second actuator electrode 24b and the at least one second stator electrode 28b. First capacitance C1 is determined according to equation (Eq. 1):

$$C1 \sim \frac{A1}{d1(p)} \qquad \text{(Eq. 1)}$$

where A1 is a first electrode area (first total electrode area) of the at least one first stator electrode 28a, and d1(p) is a first average distance of the at least one first stator electrode 28a from the at least one first actuator electrode 24a, (d1(p) being a function of external pressure p). (First electrode area/total electrode area A1 is an area/total area of at least one surface of the at least one stator electrode 28a, the at least one surface being oriented to rocker-arm structure 22.

Second capacitance C2 is correspondingly determined according to equation (Eq. 2):

$$C2 \sim \frac{A2}{d2(p)} \qquad (\text{Eq. 2})$$

where A2 is a second electrode area (second total electrode area) of the at least one second stator electrode 28b, and d2(p) is a second average distance of the at least one second stator electrode 28b from the at least one second actuator electrode 24, (the second average distance being a function of external pressure p). (Second electrode area/total electrode area A2 indicates an area/total area of at least one surface of the at least one second stator electrode 28b, the at least one surface being oriented to rocker-arm structure 22.)

If external pressure p and reference pressure pr are equal, then actuator electrodes 24a and 24b are in their starting positions; FIG. 1a indicating a first average, basic distance G1 (=d1(p=pr)) of the at least one first stator electrode 28a from the at least one first actuator electrode 24a present in its starting position, and a second average, basic distance G2 (=d2(p=pr)) of the at least one second stator electrode 28b from the at least one second actuator electrode 24b present in its starting position. If external pressure p and reference pressure pr are not equal, then the at least one first actuator electrode 24a exhibits a first average deflection $\Delta d1(p)$ from its starting position, and the at least one second actuator electrode 24b exhibits a second average deflection $\Delta d2(p)$ from its starting position. Consequently, first average distance d1(p) and second average distance d2(p) may be written according to equations (Eq. 3) and (Eq. 4):

$$d1(p) = G1 - \Delta d1(p) \qquad (\text{Eq. 3})$$

$$d2(p) = G2 + \Delta d2(p) \qquad (\text{Eq. 4})$$

For the first capacitor (made up of the at least one first actuator electrode 24a and the at least one stator electrode 28a), a first sensitivity S1 is determined according to equation (Eq. 5):

$$S1 = \frac{\Delta d1(p)}{p} \qquad (\text{Eq. 5})$$

Accordingly, for a second sensitivity S2 of the second capacitor (made up of the at least one second actuator electrode 24b and the at least one second stator electrode 28b), equation (Eq. 6) applies:

$$S2 = \frac{\Delta d2(p)}{p} \qquad (\text{Eq. 6})$$

Therefore, total change in capacitance $\Delta C$ is given by equation (Eq. 7):

$$\Delta C = C1 + C2 \sim \frac{A1}{G1 - S1*p} - \frac{A2}{G2 + S2*p} \qquad (\text{Eq. 7})$$

A Taylor series expansion for total change in capacitance $\Delta C$ at operating pressure pw is given by equation (Eq. 8):

$$T_{\Delta C}(p; pw) \sim \Delta C(pw) + \qquad (\text{Eq. 8})$$

$$\frac{\partial \Delta C(pw)}{\partial p} *(p - pw) + \frac{1}{2} * \frac{\partial^2 \Delta C(pw)}{\partial p^2}(p - pw)^2 + \ldots$$

The first term in the Taylor series expansion generating nonlinearity is proportional to $$\frac{\partial^2 \Delta C(pw)}{\partial p^2}.$$

This term $$\frac{\partial^2 \Delta C(pw)}{\partial p^2}$$

is given in equation (Eq. 9):

$$\frac{\partial^2 \Delta C(pw)}{\partial p^2} \sim \frac{2*S1*A1}{(G1 - S1*pw)^3} - \frac{2*S2*A2}{(G2 + S2*pw)^3} \qquad (\text{Eq. 9})$$

$$\frac{\partial^2 \Delta C(pw)}{\partial p^2}$$

is equal to zero when the condition of equation (Eq. 10) is satisfied:

$$\frac{A1*S1}{A2*S2} = \frac{(G1 - S1*pw)^3}{(G2 + S2*pw)^3} \qquad (\text{Eq. 10})$$

Equation (Eq. 10) may also be converted to equation (Eq. 11):

$$\frac{A1*S1}{A2*S2} = \frac{(G1 - \Delta d1(pw))^3}{(G2 + \Delta d2(pw))^3} \qquad (\text{Eq. 11})$$

where $\Delta d1(pw)$ is a first average deflection of the at least one first actuator electrode 24a from its starting position, at an external pressure p equal to operating pressure pw, and $\Delta d2(pw)$ is a second average deflection of the at least one second actuator electrode 24b from its starting position, at an external pressure p equal to operating pressure pw.

If the condition of equation (Eq. 10) and/or of equation (Eq. 11) applies, then (as discernible in light of the Taylor series expansion) total change in capacitance $\Delta C$ reacts (nearly) linearly to a pressure difference of external pressure p from operating pressure pw. Equation (Eq. 8) then reduces to equation (Eq. 12):

$$T_{\Delta C}(p; pw) \sim \Delta C(pw) + \frac{\partial \Delta C(pw)}{\partial p} * (p - pw) + 0 + \ldots \quad \text{(Eq. 12)}$$

If the condition of equation (Eq. 10) and/or of equation (Eq. 11) is satisfied, then, when a pressure difference of external pressure p from operating pressure pw is measured, ascertained total change in capacitance ΔC (that is, a corresponding signal,) may be converted to an output signal linear with respect to it. Therefore, if the condition of equation (Eq. 10) and/or of equation (Eq. 11) is satisfied, a comparatively simple and inexpensive evaluation circuit may be used for measuring the pressure difference of external pressure p from operating pressure pw (and/or the current external pressure p). In addition, in spite of the use of the comparatively simple and inexpensive evaluation circuit, the pressure difference of external pressure p from operating pressure pw (and/or the current external pressure p) may be measured with a comparatively high accuracy and at a relatively low error rate, if the condition of equation (Eq. 10) and/or of equation (Eq. 11) is satisfied.

Consequently, each micromechanical component satisfying the condition of the equation (Eq. 10) and/or of the equation (Eq. 11) is advantageously configured to measure the pressure difference of external pressure p from operating pressure pw (and/or current external pressure p). In addition, (due to the linearity between total change in capacitance ΔC and the pressure difference of external pressure p from operating pressure pw,) each micromechanical component satisfying the condition of the equation (Eq. 10) and/or of the equation (Eq. 11) may be calibrated, using only a measurement of two different pressure values. Therefore, in the case of the micromechanical component satisfying the condition of equation (Eq. 10) and/or of equation (Eq. 11), the required work to be carried out for the calibration is comparatively little.

The micromechanical component of FIGS. 1a and 1b satisfies the conditions of equations (Eq. 10) and (Eq. 11). By way of example, first electrode area A1 (first total electrode area) of the at least one first stator electrode 28a is equal to second electrode area A2 (second total electrode area) of the at least one second stator electrode 28b. In addition, first sensitivity S1 of the first capacitor is equal to second sensitivity S2 of the second capacitor, which is why first average deflection Δd1(pw) (of the at least one first actuator electrode 24a from its starting position, at an external pressure p equal to operating pressure pw,) is equal to the second average deflection Δd2(pw) (of the at least one second actuator electrode 24b from its starting position, at an external pressure p equal to operating pressure pw).

(If A1=A2 and S1=S2,) Equation (Eq. 10) and equation (Eq. 11) reduce to equation (Eq. 13) and equation (Eq. 14), respectively:

$$G1-G2=2*s1*pw \quad \text{(Eq. 13)}$$

$$G1-G2=2*\Delta d1(pw) \quad \text{(Eq. 14)}$$

Average basic distances G1 and G2 are selected intentionally to be different in such a manner, that their difference corresponds to twice the first average deflection Δd1(pw) (of the at least one first actuator electrode 24a from its starting position, at an external pressure p equal to operating pressure pw).

Consequently, equations (Eq. 15) and (Eq. 16) may be derived from equations (Eq. 3) and (Eq. 4) (if A1=A2 and S1=S2):

$$d1(pw)=G2+2*\Delta d1(pw)-\Delta d1(pw)=G2+\Delta d1(pw) \quad \text{(Eq. 15)}$$

$$d2(pw)=G2+\Delta d2(p)=G2+\Delta d1(p) \quad \text{(Eq. 16)}$$

Therefore, average basic distances G1 and G2 are set to be unequal in such a manner, that at operating pressure pw, first average distance d1(pw) (of the at least one first stator electrode 28a from the at least one first actuator electrode 24a) is equal to second average distance d2(pw) (of the at least one second stator electrode 28b from the at least one second actuator electrode 24b).

The pressure sensor device implemented with the aid of the micromechanical component of FIGS. 1a and 1b also reacts relatively indifferently to an application of pressure or force to housing 10 from the outside. If, for example, mounting board 12 is deformed, then, as a rule, the deformation produces a first deformation-based change in distance between the at least one first actuator electrode 24a and the at least one first stator electrode 28a, which is (nearly) equal to a second deformation-based change in distance between the at least one second actuator electrode 24b and the at least one second stator electrode 28b. Thus, effects of the deformation-based changes in distance mutually compensate for each other and, as a rule, scarcely result in an error signal.

Figure 2:
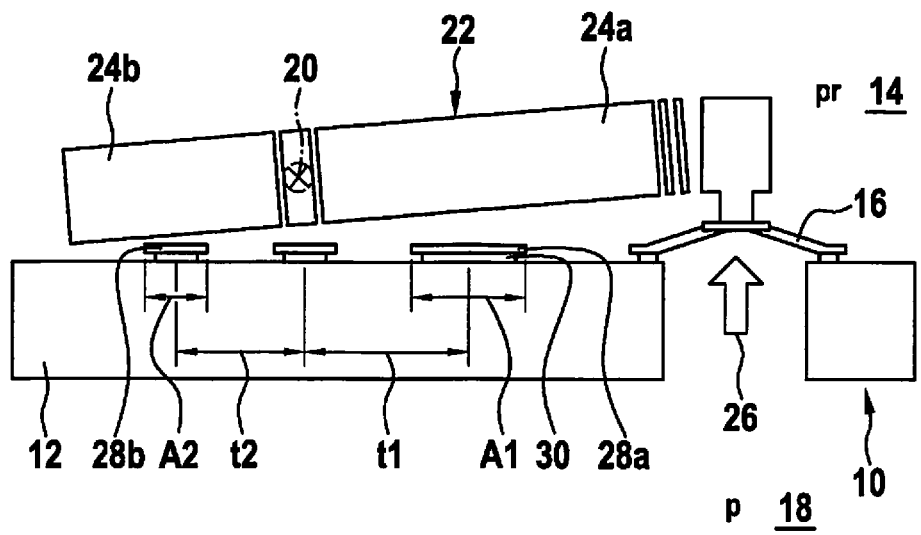
FIG. 2 shows a schematic view of a second specific embodiment of the micromechanical component.

FIG. 2 shows a schematic view of a second specific embodiment of the micromechanical component.

The micromechanical component of FIG. 2 also achieves the advantages of the specific embodiment described above, although first average, basic distance G1 (of the at least one first stator electrode 28a from the at least one first actuator electrode 24a present in its starting position) is equal to second average, basic distance G2 (of the at least one second stator electrode 28b from the at least one second actuator electrode 24b present in its starting position). However, first electrode area A1 (first total electrode area) of the at least one first stator electrode 28a and second electrode area A2 (second total electrode area) of the at least one second stator electrode 28b are set to be different in such a manner, that the conditions of equations (Eq. 10) and (Eq. 11) are satisfied.

First sensitivity S1 (of the first capacitor made up of the at least one first actuator electrode 24 and the at least one first stator electrode 28a) may be equal to second sensitivity S2 (of the second capacitor made up of the at least one second actuator electrode 24b and the at least one second stator electrode 28b). Equations (Eq. 10) and (Eq. 11) reduce to equations (Eq. 17) and (Eq. 18) (if G1=G2 and S1=S2):

$$\frac{A1}{A2} = \frac{(G1-S1*pw)^3}{(G1+S1*pw)^3} \quad \text{(Eq. 17)}$$

$$\frac{A1}{A2} = \frac{(G1-\Delta d1(pw))^3}{(G1+\Delta d1(pw))^3}. \quad \text{(Eq. 18)}$$

Alternatively, in addition to electrode areas A1 and A2, sensitivities S1 and S2 may also be set to be different. In particular, a difference between first capacitance C1 and second capacitance C2 may be kept small by setting sensitivities S1 and S2 to be unequal. This may be ensured by reducing second sensitivity S2 (in comparison with first sensitivity S1), if a second electrode area A2 is greater (in comparison with first electrode area A1), and reducing first sensitivity S1 (in comparison with second sensitivity S2), if first electrode area A1 is greater (in comparison with second electrode area A2).

In the specific embodiment of FIG. 2, the at least one first stator electrode 28a has a greater first electrode area A1 (in comparison with second electrode area A2), but is situated at a first average rotational axis distance t1 from axis of rotation 20 (that is, from a projection of axis of rotation 20 onto an upper surface of mounting board 12 fitted with stator electrodes 28a and 28b); the first average rotational axis distance being greater than a second average rotational axis distance t2 of the at least one second stator electrode 28b from axis of rotation 20 (that is, from the projection of axis of rotation 20 onto the upper surface fitted with stator electrodes 28a and 28b). Consequently, first sensitivity S1 is reduced (in comparison with second sensitivity S2). Due to this advantageous ratio of sensitivities S1 and S2, a difference between first capacitance C1 and second capacitance C2 remains comparatively low during operation of the micromechanical component of FIG. 2 (in spite of unequal electrode areas A1 and A2). Therefore, evaluation circuits, which are configured for only relatively small differences between first capacitance C1 and second capacitance C2, may also be used for the micromechanical component of FIG. 2.

The micromechanical component of FIG. 2 also has a relatively low sensitivity to stress (while retaining the linearity between total change in capacitance ΔC and the pressure difference of external pressure p from operating pressure pw). If, for example, mounting board 12 is deformed, then, a first partial change in capacitance of first capacitor C1 due to the first deformation-based change in distance (between the at least one first actuator electrode 24a and the at least one first stator electrode 28a) may be compensated for by a second partial change in capacitance of second capacitor C2 due to the second deformation-based change in distance (between the at least one second actuator electrode 24b and the at least one second stator electrode 28b).

Figure 3:
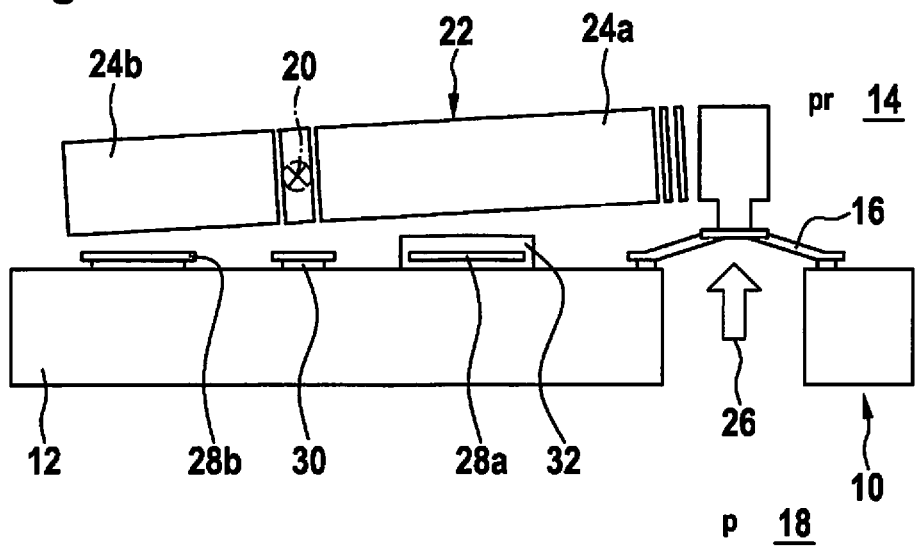
FIG. 3 shows a schematic view of a third specific embodiment of the micromechanical component.

FIG. 3 shows a schematic view of a third specific embodiment of the micromechanical component.

The specific embodiment of FIG. 3 also satisfies the condition of equation (Eq. 10) and/or of equation (Eq. 11) and therefore provides the advantages described above.

This is ensured, as sensitivities S1 and S2 are set to be different at equal basic distances G1 and G2 and equal electrode areas/total electrode areas A1 and A2, in such a manner, that the above-mentioned conditions of equations (Eq. 10) and (Eq. 12) are satisfied. In the specific embodiment of FIG. 3, average rotational axis distances t1 and t2 are also equal. However, in comparison with the at least one second stator electrode 28b, (at least part of) the at least one first stator electrode 28a has an additional insulating cover 32. Additional insulating cover 32 may be present on the at least one surface of the at least one stator electrode 28a oriented to rocker-arm structure 22. One may also describe additional insulating cover 32 as a dielectric only present locally on the at least one first stator electrode 28a. (In one alternative specific embodiment, the at least one second stator electrode 28b may correspondingly include, in comparison with the at least one first stator electrode 28a, an additional insulating cover 32.) Equations (Eq. 10) and (Eq. 11) reduce to equations (Eq. 19) and (Eq. 20) (if G1=G2 and A1=A2):

$$\frac{S1}{S2} = \frac{(G1 - S1 * pw)^3}{(G1 + S2 * pw)^3} \quad \text{(Eq. 19)}$$

$$\frac{S1}{S2} = \frac{(G1 - \Delta d1(pw))^3}{(G2 + \Delta d2(pw))^3} \quad \text{(Eq. 20)}$$

($\Delta d2(pw)$ may additionally be equal to $\Delta d1 (pw)$.)

Combinations of features of all of the specific embodiments described above are also possible. It should also be pointed out that the pressure sensors implementable with the aid of the micromechanical components may be effectively manufactured as modules, together with acceleration and yaw-rate sensors, and may effectively interact with them.

Figure 4:
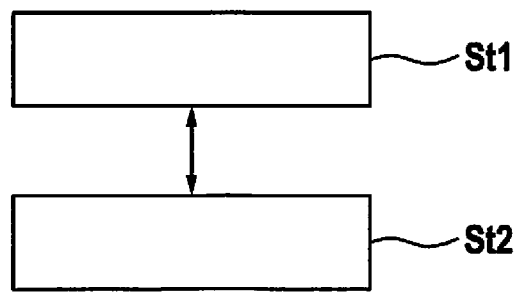
FIG. 4 shows a flow chart for explaining a specific embodiment of the method for manufacturing a micromechanical component for a pressure sensor device.

FIG. 4 shows a flow chart for explaining a specific embodiment of the method for manufacturing a micromechanical component for a pressure sensor device.

The method described in the following may be implemented, for example, to manufacture one of the micromechanical components explained above. However, it is emphasized that the ability to implement the method described in the following is not limited to the manufacture of one of these micromechanical components.

In a method step St1, a rocker-arm structure tiltable about a future axis of rotation during operation of the micromechanical component is formed; on the rocker-arm structure, at least one first actuator electrode being formed on the first side of the future axis of rotation, and at least one second actuator electrode being formed on a second side of the future axis of rotation. In a method step St2, a housing is formed, which encloses an inner volume in an airtight manner. The housing is formed to have at least one first stator electrode rigidly attached to the housing and assigned to the at least one first actuator electrode, and at least one second stator electrode rigidly attached the housing and assigned to the at least one second actuator electrode. In addition, a reference pressure present in the inner volume is separated by a diaphragm from an external pressure present in an outer volume of the housing, and the rocker-arm structure is joined to the diaphragm in such a manner, that during operation of the micromechanical component, the rocker-arm structure and its actuator electrodes are present in their starting positions, if the external pressure and the reference pressure are equal, and the rocker-arm structure is rotated about the axis of rotation, out of its starting position, if the external pressure and the reference pressure are not equal.

The at least one first stator electrode is configured with a first electrode area greater than or less than a second electrode area of the at least one second stator electrode; with a first average, basic distance from the at least one first actuator electrode present in its starting position, different from a second average, basic distance of the at least one second stator electrode from the at least one second actuator electrode present in its starting position; and/or with, in comparison with the at least one second stator electrode, an additional insulating cover. Consequently, the method described here also provides the advantages already listed above.

For example, the micromechanical component is configured to measure a pressure difference of the external pressure from an operating pressure pw, as it is stipulated that the above-mentioned condition of equations (Eq. 10) and (Eq. 11) be satisfied. In particular, the first electrode area may be set equal to the second electrode area, and the first sensitivity may be set equal to the second sensitivity. In this case, a difference between the first average, basic distance and the second average, basic distance is advantageously formed in such a manner, that at the operating pressure, a first average distance of the at least one first stator electrode from the at least one first actuator electrode is equal to a second average distance of the at least one second stator electrode to the at least one second actuator electrode.

In order to generate the advantageous difference between the first average, basic distance and the second average, basic distance, the single first stator electrode or at least one of the first stator electrodes and the single second stator electrode or at least one of the second stator electrodes are formed on at least a portion of the housing. Prior to the actual sacrificial-layer deposition, a first sacrificial layer may be subsequently deposited on all of the stator electrodes formed on the portion of the housing, and the first sacrificial layer is removed either on the single first stator electrode or on the at least one of the first stator electrodes, or on the single second stator electrode or on the at least one of the second stator electrodes. Only then, are a second sacrificial layer and at least one material of the future actuator electrodes deposited (as the actual sacrificial-layer deposition) on all of the stator electrodes formed on the portion of the housing. Even a simple deposition method for forming the first sacrificial layer allows a layer thickness of the first sacrificial layer, and consequently, the difference between the first average, basic distance and the second average, basic distance, to be set highly precisely. Using the method described here, one is therefore able to set a difference between the two basic distances that is determined highly accurately and is readily reproducible.

Alternatively, a (single) sacrificial layer may also be deposited on all of the stator electrodes formed on the portion of the housing, and the sacrificial layer may be thinned back either on the single first stator electrode or the at least one of the first stator electrodes, or on the single second stator electrode or the at least one of the second stator electrodes, before the at least one material of the future actuator electrodes is deposited on all of the stator electrodes formed on the portion of the housing. This method requires less work.

The processes described here may also be combined with each other. Basic distances from stator electrodes, which are situated on a side of the rocker-arm structure away from the diaphragm, may also be set in an advantageous manner, using the procedure described here. The methods described above may also be employed repeatedly, in order to generate a graded shape for at least one of the basic distances. In this context, the objective is, in turn, to obtain average distances at the operating pressure, which are as equal as possible.

What is claimed is:

1. A micromechanical component for a pressure sensor device, comprising:
   a housing, which encloses an inner volume in an airtight manner and has a diaphragm that separates a reference pressure present in the inner volume from an external pressure present in an outer volume of the housing;
   a rocker-arm structure, which is tiltable about an axis of rotation and has at least one first actuator electrode formed on the rocker-arm structure, on a first side of the axis of rotation, and at least one second actuator electrode formed on the rocker-arm structure, on a second side of the axis of rotation; the rocker-arm structure being joined to the diaphragm so that when the external pressure and the reference pressure are equal, the rocker-arm structure and its actuator electrodes are present in their starting positions, and when the external pressure and the reference pressure are not equal, the rocker-arm structure rotates about the axis of rotation, out of its starting position; and
   at least one first stator electrode rigidly attached to the housing and assigned to the at least one first actuator electrode, and at least one second stator electrode rigidly attached to the housing and assigned to the at least one second actuator electrode, wherein a first capacitance between the at least one first actuator electrode and the at least one first stator electrode differing from a second capacitance between the at least one second actuator electrode and the at least one second stator electrode if the rocker-arm structure and its actuator electrodes are in their starting positions;
   wherein a first area of the first electrode surface of the at least one first stator electrode is equal to a second area of the second electrode surface of the at least one second stator electrode,
   wherein a first sensitivity of a first capacitor made up of the at least one first actuator electrode and the at least one first stator electrode is equal to a second sensitivity of a second capacitor made up of the at least one second actuator electrode and the at least one second stator electrode,
   wherein a first average, basic distance (G1) of the at least one first stator electrode from the at least one first actuator electrode present in its starting position differs from a second average, basic distance (G2) of the at least one second stator electrode from the at least one second actuator electrode present in its starting position,
   wherein the micromechanical component is configured to measure a pressure difference of the external pressure from an operating pressure (pw), at the operating pressure (pw), a first average distance (d1(pw)) of the at least one first stator electrode from the at least one first actuator electrode being equal to a second average distance (d2(pw)) of the at least one second stator electrode from the at least one second actuator electrode, in that a difference between the first average, basic distance and the second average, basic distance (G2) is developed so that:

$$G1-G2=2*\Delta d1(pw),$$

where $\Delta d1(pw)$ is a first average deflection of the at least one first actuator electrode from its starting position at the external pressure p equal to the operating pressure pw.

2. A pressure sensor device, comprising:
   a micromechanical component, including:
      a housing, which encloses an inner volume in an airtight manner and has a diaphragm that separates a reference pressure present in the inner volume from an external pressure present in an outer volume of the housing;
      a rocker-arm structure, which is tiltable about an axis of rotation and has at least one first actuator electrode formed on the rocker-arm structure, on a first side of the axis of rotation, and at least one second actuator electrode formed on the rocker-arm structure, on a second side of the axis of rotation; the rocker-arm structure being joined to the diaphragm so that when the external pressure and the reference pressure are equal, the rocker-arm structure and its actuator electrodes are present in their starting positions, and when the external pressure and the reference pressure are not equal, the rocker-arm structure rotates about the axis of rotation, out of its starting position; and
      at least one first stator electrode rigidly attached to the housing and assigned to the at least one first actuator electrode, and at least one second stator electrode rigidly attached to the housing and assigned to the at least one second actuator electrode, wherein a first capacitance between the at least one first actuator electrode and the at least one first stator electrode differing from a second capacitance between the at least one second actuator electrode and the at least one second stator electrode if the rocker-arm structure and its actuator electrodes are in their starting positions;

wherein a first area of the first electrode surface of the at least one first stator electrode is equal to a second area of the second electrode surface of the at least one second stator electrode, wherein a first sensitivity of a first capacitor made up of the at least one first actuator electrode and the at least one first stator electrode is equal to a second sensitivity of a second capacitor made up of the at least one second actuator electrode and the at least one second stator electrode, wherein a first average, basic distance (G1) of the at least one first stator electrode from the at least one first actuator electrode present in its starting position differs from a second average, basic distance (G2) of the at least one second stator electrode from the at least one second actuator electrode present in its starting position, wherein the micromechanical component is configured to measure a pressure difference of the external pressure from an operating pressure (pw), at the operating pressure (pw), a first average distance ($d1(pw)$) of the at least one first stator electrode from the at least one first actuator electrode being equal to a second average distance ($d2(pw)$) of the at least one second stator electrode from the at least one second actuator electrode, in that a difference between the first average, basic distance and the second average, basic distance (G2) is developed so that:

$$G1-G2=2\cdot\Delta d1(pw),$$

where $\Delta d1(pw)$ is a first average deflection of the at least one first actuator electrode from its starting position at the external pressure p equal to the operating pressure pw.

3. The micromechanical component of claim 2 wherein the micromechanical components is configured to measure a pressure difference of the external pressure from the operating pressure.

4. A method for manufacturing a micromechanical component for a pressure sensor device, the method comprising:

forming a rocker-arm structure tiltable about a future axis of rotation during operation of the micromechanical component; on the rocker-arm structure, at least one first actuator electrode being formed on a first side of the future axis of rotation, and at least one second actuator electrode being formed on a second side of the future axis of rotation;

forming a housing, which encloses an inner volume in an airtight manner and includes at least one first stator electrode rigidly attached to the housing and assigned to the at least one first actuator electrode, and at least one second stator electrode rigidly attached to the housing and assigned to the at least one second actuator electrode; a reference pressure present in the inner volume being separated by a diaphragm from an external pressure present in an outer volume of the housing, and the rocker-arm structure being joined to the diaphragm so that during operation of the micromechanical component, the rocker-arm structure and its actuator electrodes are present in their starting positions, if the external pressure and the reference pressure are equal, and the rocker-arm structure is rotated about the axis of rotation, out of its starting position, if the external pressure and the reference pressure are not equal, wherein a first capacitance between the at least one first actuator electrode and the at least one first stator electrode differ from a second capacitance between the at least one second actuator electrode and the at least one second stator electrode if the rocker-arm structure and its actuator electrodes are in their starting positions;

forming a first area of the first electrode surface of the at least one first stator electrode equal to a second area of the second electrode surface of the at least one second stator electrode;

forming a first sensitivity of a first capacitor made up of the at least one first actuator electrode and the at least one first stator electrode equal to a second sensitivity of a second capacitor made up of the at least one second actuator electrode and the at least one second stator electrode;

forming a first average, basic distance (G1) of the at least one first stator electrode from the at least one first actuator electrode present in its starting position, which differs from a second average, basic distance (G2) of the at least one second stator electrode from the at least one second actuator electrode present in its starting position; and configuring the micromechanical component to measure a pressure difference of the external pressure from an operating pressure pw, at the operating pressure (pw), a first average distance ($d1(pw)$) of the at least one first stator electrode from the at least one first actuator electrode being equal to a second average distance ($d2(pw)$) of the at least one second stator electrode from the at least one second actuator electrode, in that a difference between the first average, basic distance and the second average, basic distance (G2) is developed so that:

$$G1-G2=2*\Delta d1(pw),$$

where $\Delta d1(pw)$ is a first average deflection of the at least one first actuator electrode from its starting position at the external pressure p equal to the operating pressure pw.

* * * * *